(12) United States Patent
Buckley et al.

(10) Patent No.: US 9,991,827 B1
(45) Date of Patent: Jun. 5, 2018

(54) METHODS AND APPARATUS FOR AUTOMATIC LEAD ANGLE ADJUSTMENT USING FLY-BACK VOLTAGE FOR BRUSHLESS DC CONTROL

(71) Applicant: Texas Instruments Incorporated, Dallas, TX (US)

(72) Inventors: Zachery Scott Buckley, Richardson, TX (US); Seil Oh, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days. days.

(21) Appl. No.: 15/425,727

(22) Filed: Feb. 6, 2017

(51) Int. Cl.
*H02P 6/18* (2016.01)
*H02P 6/15* (2016.01)
*H02P 6/182* (2016.01)

(52) U.S. Cl.
CPC .............. *H02P 6/157* (2016.02); *H02P 6/182* (2013.01)

(58) Field of Classification Search
CPC ...... H02P 6/00; H02P 6/18; H02P 6/12; H02P 6/14; H02P 1/00; H02P 1/18; H02P 1/46; H02P 1/04; H02P 25/08; H02P 25/10; H02P 27/00; H02P 29/00; H02K 29/06
USPC ............ 318/400.01, 400.14, 400.15, 400.32, 318/400.33, 400.35, 400.36, 700, 701, 318/727, 779, 799, 432, 437; 388/800, 388/833, 901, 928.1
See application file for complete search history.

(56) References Cited

U.S. PATENT DOCUMENTS

| | | | |
|---|---|---|---|
| 5,492,273 A * | 2/1996 | Shah | F24F 11/0009 236/11 |
| 6,222,333 B1 | 4/2001 | Garnett et al. | |
| 6,718,125 B2 | 4/2004 | Clark et al. | |
| 6,788,024 B2 | 9/2004 | Kaneko et al. | |
| 7,477,034 B2 * | 1/2009 | MacKay | H02P 6/182 318/254.1 |
| 8,030,867 B1 * | 10/2011 | Allison | H02P 6/182 318/400.01 |
| 8,212,508 B2 | 7/2012 | Paintz et al. | |
| 8,461,789 B2 * | 6/2013 | Paintz | H02P 6/182 318/400.35 |
| 8,552,671 B2 | 10/2013 | Tieu | |
| 8,760,098 B2 | 6/2014 | Qin | |
| 9,479,096 B2 * | 10/2016 | Heynlein | H02P 6/18 |
| 2012/0068642 A1 | 3/2012 | Chen et al. | |

\* cited by examiner

*Primary Examiner* — Antony M Paul
(74) *Attorney, Agent, or Firm* — Lawrence J. Bassuk; Charles A. Brill; Frank D. Cimino

(57) ABSTRACT

A method includes: outputting high side driver gate signals to a plurality of high side driver devices and outputting low side driver gate signals to a plurality of low side driver devices configured to control current supplied to a motor having coils coupled to receive the current at a plurality of phase nodes; at a time approximately prior to an expected zero crossing of a voltage at a selected one of the plurality of phase nodes, disabling the high side driver gate signal and the low side driver gate signal; measuring a back electromotive force (BEMF) voltage and observing a zero crossing time; estimating a next zero crossing time; prior to the next zero crossing time, disabling the high side driver gate signal and the low side driver gate signal and observing the selected one of the phase nodes to form a first sample; and following the next zero crossing time, observing a second voltage at the selected one of the phase nodes to form a second sample.

15 Claims, 7 Drawing Sheets

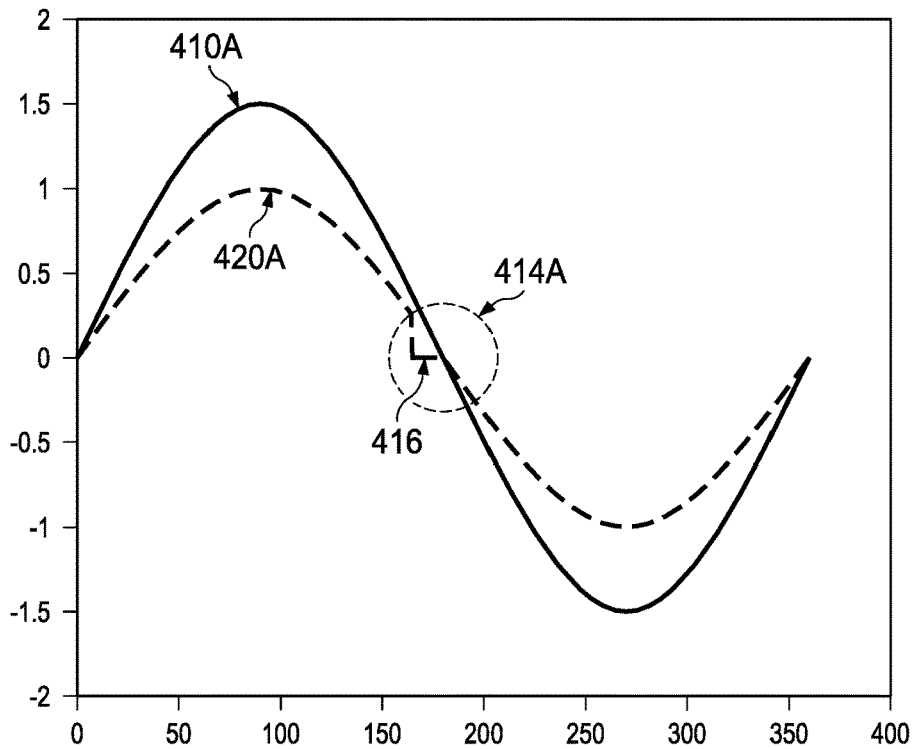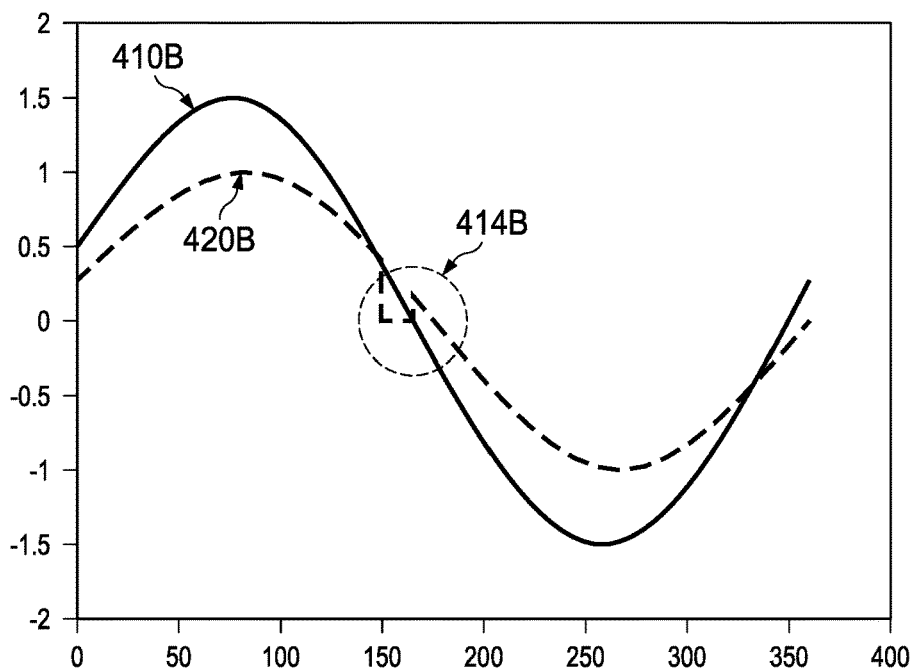

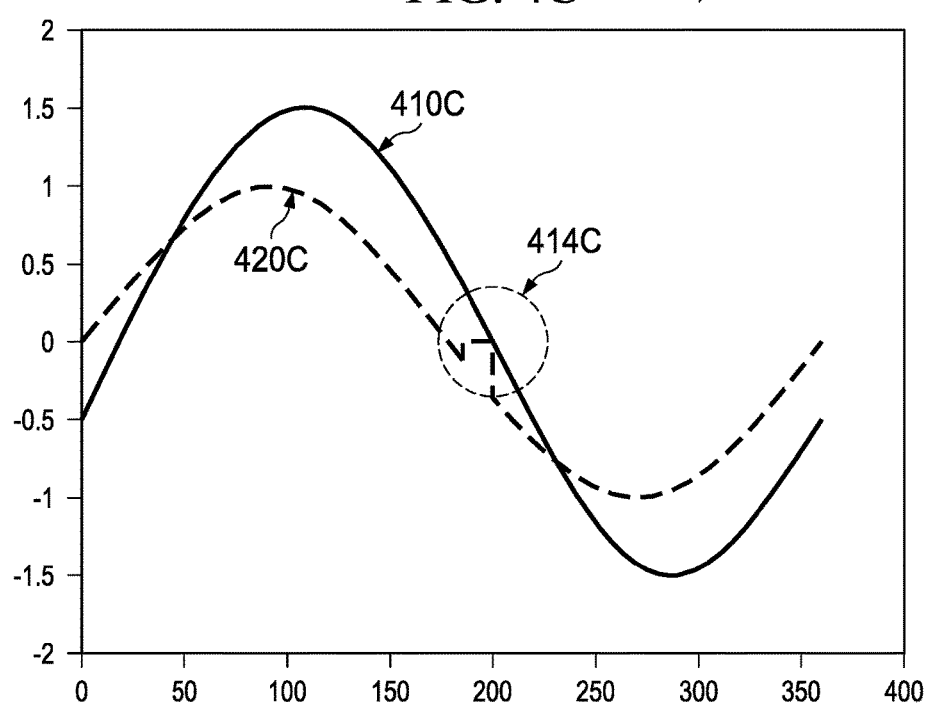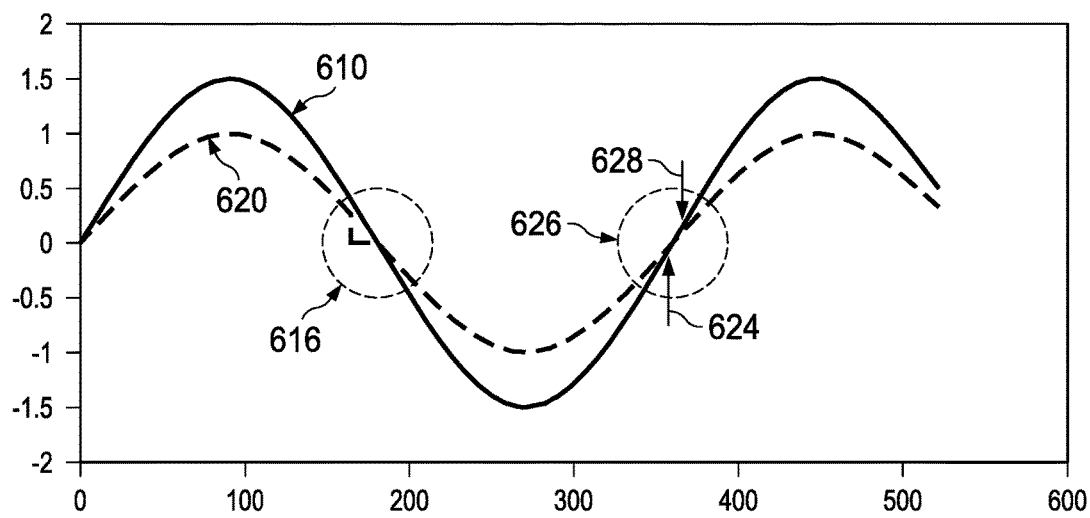

METHODS AND APPARATUS FOR AUTOMATIC LEAD ANGLE ADJUSTMENT USING FLY-BACK VOLTAGE FOR BRUSHLESS DC CONTROL

TECHNICAL FIELD

This relates in general to electronic circuitry for brushless motor control, and in particular to a method and apparatus for automatic lead angle adjustment for a DC motor using the fly-back voltage.

BACKGROUND

Electric motors convert electricity into rotating motion using magnetism. In a conventional electrical motor, there are two parts: a fixed part called the stator and a rotating part called the rotor.

Electrical Motors can be divided into DC motors and AC motors. Within the AC Motors category, there are two broad classes: Induction Motors and permanent magnet synchronous motors (PMSM). Within the DC motors category there are two broad classes: Brushed Motors and Brushless Motors.

In each of the motor classes, the rotor and stator have magnets with opposing magnetic fields. The magnetic field can be created with permanent magnets or with electro-magnets. Typically at least one set of the magnets are electro-magnets so that the electro-magnets can be sequentially energized, creating a rotating magnetic field. This rotating magnetic field results in the magnetic poles on the rotor and stator pulling and pushing to the nearest magnetic pole. The process of continual sequentially energizing the electro-magnets to create a rotating magnetic field is call "commutating". In a brushed DC motor, the rotation is accomplished via a mechanical commutator, in which case the term "self-commutating" is used. For brushless DC motors, where the commutation is performed by a motor controller, the term "external commutation" is used.

When a rotor is mechanically rotated, the magnetic field interaction between the rotor and stator generates a voltage. A motor used in this fashion is called a generator. The faster the rotation of the rotor, the higher the generated voltage. When a rotor is turned electrically, the magnetic field interaction between the rotor and stator creates a voltage just as if the motor was a generator. The voltage created corresponds to a force that opposes the voltage used to drive the electromagnets in the motor. This force has several names, two common names are "counter-electromotive force" and "back-electromotive force" or "BEMF." The term BEMF is used herein to refer to this induced voltage. The BEMF voltage has a magnitude proportional to the rotational speed of the rotor.

In a brushed DC motor, the rotor has electro-magnets, and commutation is accomplished mechanically with a segmented contact on the rotor shaft where the various electro-magnets of the rotor are connected. A brush, typically a carbon block, conducts current to the segments on the commutator that energizes the electro-magnets on the rotor. As the rotor turns, the brushes move from one to another set of contacts, energizing another set of electro-magnets. Sequential energizing of the electro-magnets causes the rotor to turn. In the case of a brushed DC motor, simply supplying DC power to the motor will cause the rotor to turn.

In a brushless DC motor, the rotor has permanent magnets and the stator has electro-magnets. The stator windings are externally commutated by a motor controller that uses the sensed speed and position of the rotor to time the energizing of the electro-magnet coils so as to cause the rotor to turn. In some externally commutated motors Hall Effect sensors are used by the motor controller to sense the position and speed of the rotor.

As the rotor turns, a BEMF is generated in the stator that is proportional to the speed of the rotor. Some motor controllers measure the BEMF voltage to sense the position and speed of the rotor. This approach eliminates the need, cost and size of the Hall Effect sensors. Motor controllers using this technique are sometimes called "sensorless" controllers. Product applications that can take advantage of the smaller, less costly sensorless controllers benefit from the sensorless technique. Further improvement and simplification of the motor/controller devices is an ongoing effort.

SUMMARY

A method includes: outputting high side driver gate signals to a plurality of high side driver devices, and outputting low side driver gate signals to a plurality of low side driver devices, configured to control current supplied to a motor having a plurality of phase nodes; at a time approximately prior to an expected zero crossing at a selected phase node, disabling the high side driver gate signal and the low side driver gate signal; measuring a back electromotive force (BEMF) voltage and observing a zero crossing time; estimating a next zero crossing time; prior to the next zero crossing time, disabling the high side driver gate signal and the low side driver gate signal that are coupled to the selected phase node and observing a first voltage to form a first sample; and following the next zero crossing time, observing a second voltage to form a second sample.

BRIEF DESCRIPTION OF THE DRAWINGS

FIGS. 4A, 4B and 4C are graphs showing the BEMF measurement window.

FIG. 6 is a graph of motor current and BEMF indicating the sampling windows from an example embodiment.

DETAILED DESCRIPTION OF EXAMPLE EMBODIMENTS

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Optimal performance of a brushless DC motor is achieved when the motor current and BEMF voltage are in phase.

BEMF is an intrinsic property of the motor and the BEMF phase varies with rotor speed and load. The motor current phase is adjusted by the motor controller by adjusting an applied motor voltage phase. For a motor controller to keep the BEMF phase and motor current phase aligned, the controller needs to know the BEMF voltage phase and the motor current phase. In a direct measurement approach, the motor current is measured with a shunt resistor, and the BEMF voltage is measured across the motor stator windings.

An example embodiment provides a brushless motor controller that dynamically determines the motor current phase by using a fly-back voltage measurement, resulting in an ability to dynamically adjust the current lead angle to maintain the motor in the optimum or near optimum operating condition. Elimination of the prior solution current measurement hardware reduces complexity, cost and size of the motor controller.

Figure 1:
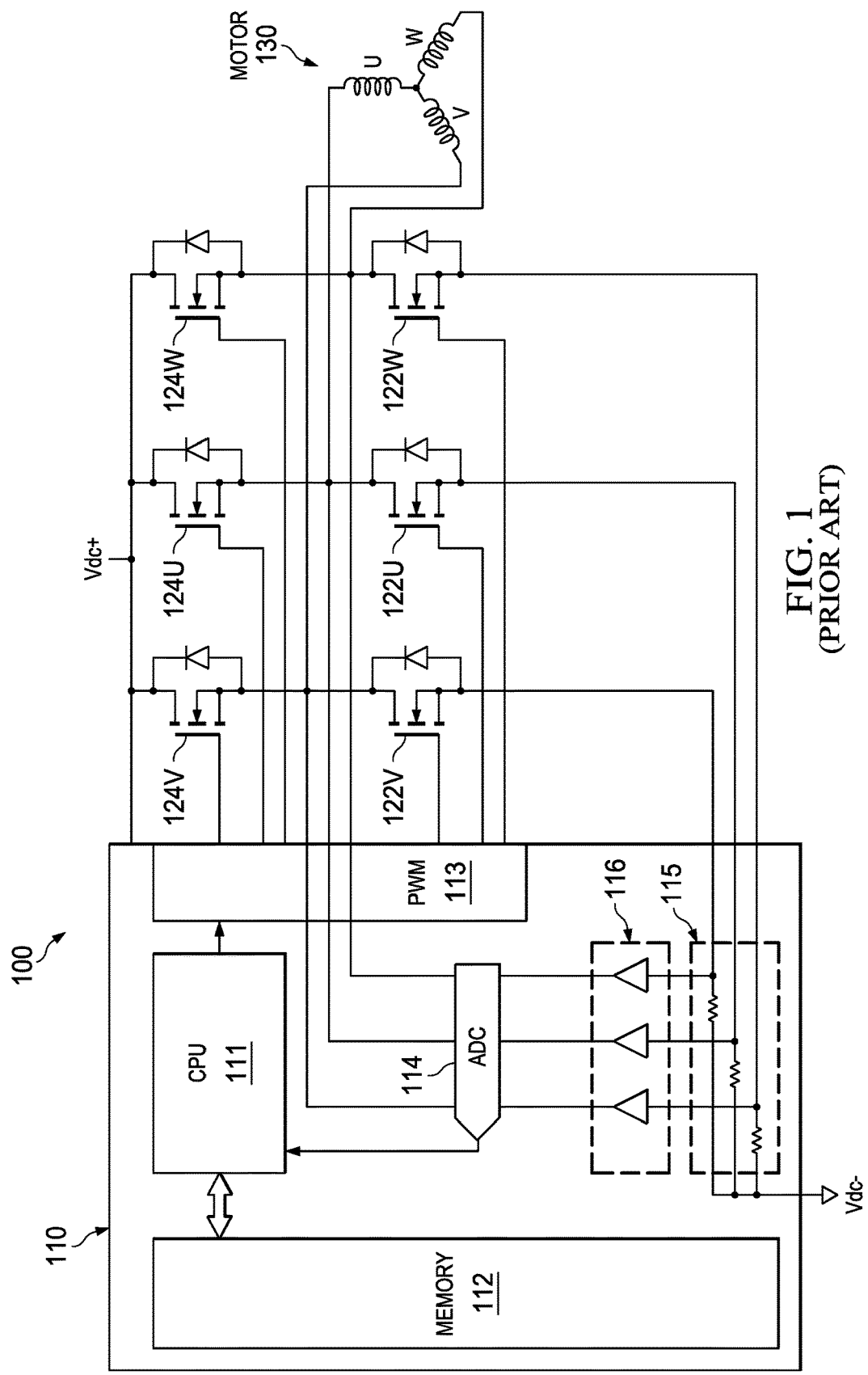
FIG. 1 is a block diagram of a basic three phase brushless motor driver system.

FIG. 1 is a block diagram of a conventional three phase brushless motor driver system 100. The brushless motor system 100 contains a controller 110, six drive devices which are transistors shown as field effect transistors (FETS) 122U, 122V, 122W, 124U, 124V, 124W, and a motor 130. Within the controller 110, there is a CPU 111, memory 112, pulse width modulation (PWM) driver 113, a sampling circuit implemented by an analog to digital converter (ADC) 114, phase shunt resistors 115 and shunt amplifiers 116. The motor 130 windings are designated as U, V, W and each winding has a pair of FETS with a "high side driver" FET 124U, 124V, 124W that couples the respective motor winding to Vdc+ and a "low side FET" 122U, 122V, 122W that couples the respective winding to Vdc−. Although not all communication lines are drawn for simplicity, the CPU 111 communicates with at least the PWM 113 block, memory 112 and the ADC block 114. In alternative embodiments, the respective windings can be coupled to ground instead of Vdc−, and either reference voltage can be used to form additional embodiments.

The ADC block 114 is coupled to the CPU 111, the shunt amplifiers 116 and the winding connections for the three windings labeled U, V, and W, in motor 130. Depending on a variety of factors, such as the scale of integration, and the size and power of the motor, controller 110 can be fabricated as a single integrated circuit containing all the components shown in block 110. In an example arrangement, the integrated circuit controller 110 can also contain the drive FETS 124U, 124V, 124W and 122U, 122V, 122W for a lower power motor. In another arrangement the controller 110 can be fabricated entirely of discrete components or some combination of integrated circuits and discrete components. Within the controller 110, the CPU 111 could be a DSP (digital signal processor), a MCU (micro controller unit), a reduced instruction set computer core such as a RISC or ARM core, a MSP (mixed signal processor) or any other processing circuit capable of performing the computations.

In operation, controller 110 provides the external commutation for the motor 130. A program stored in the memory 112 is executed by the CPU 111 that provides timed pulses to the PWM module 113 in controller 110. The PWM module 113 drives the high side FETS 124U, 124V, 124W and low side FETS 122U, 122V, 122W to supply energy to the electro-magnets resulting in the external-commutating of the motor 130. The commutation of the motor 130 creates a rotational magnetic field which resulting in the rotor (not shown) turning.

CPU 111 uses the BEMF voltage and motor current information to perform processes necessary to time the pulses to the PWM sections 113. The optimum motor performance is achieved when the BEMF voltage and motor current cross a zero voltage line at the same time. To sense the motor current for a specific phase, the ADC 114 samples the voltage from the shunt resistor 115/amplifier 116 associated with the respective motor winding U, V and W. To sense the BEMF voltage, the FETS for a particular winding are turned off briefly, allowing the winding to "float" for a window of time so that the BEMF voltage can be sampled by the ADC 114. When the winding lead is floated, there is a collapse of the magnetic field from the coil in the winding resulting in a voltage on the lead. That voltage is commonly referred to as the "fly-back" voltage, and after the fly-back voltage dissipates, the BEMF voltage can be sampled by the ADC 114.

Figure 2A:
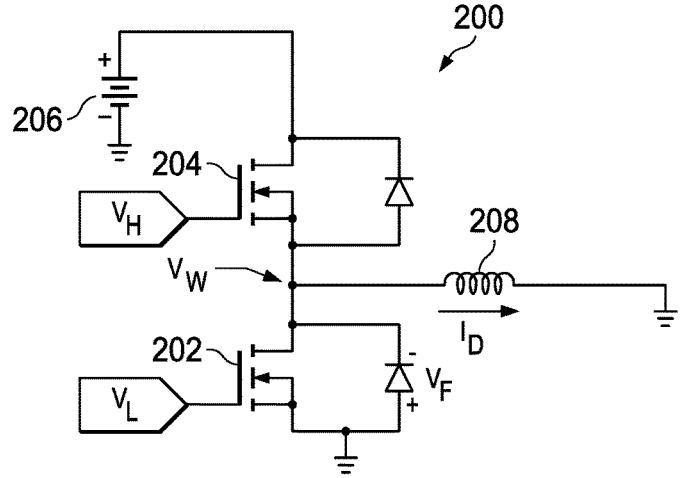
FIGS. 2A and 2B are a circuit schematic of a high side FET controlled motor winding and a graph of the corresponding fly-back voltage, respectively.
Figure 2B:
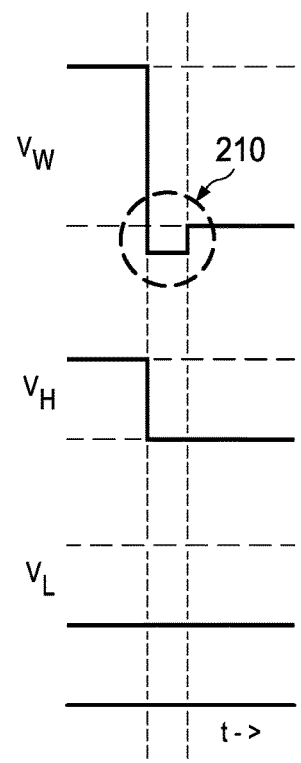

FIGS. 2A and 2B are a schematic of a high side FET controlled motor winding, and a graph of the corresponding fly-back voltage, respectively. Schematic 200 shows a motor winding 208 connected to a pair of FET drivers, a high side FET 204 and a low side FET 202. The second terminal of the winding 208 is connected to ground. A battery 206 supplies power to the winding through the high side FET 204. The gate of high side FET 204 is driven by control voltage $V_H$ and the gate of the low side FET 202 is driven by control voltage $V_L$. As described hereinabove, the ground voltage can be replaced with another reference voltage Vdc− to form alternative embodiments.

In FIG. 2B, three graphs $V_W$, $V_H$, $V_L$ show voltage plotted on a vertical axis and have the same horizontal axis representing time. The top graph $V_W$ illustrates the voltage at the winding node $V_W$, the middle graph illustrates the high side FET control voltage $V_H$ and the bottom graph illustrates the low side FET control voltage $V_L$. In this situation, the low side driver FET is off during the entire time displayed, resulting in no current flow through the low side FET 202.

The region labeled 210 in FIG. 2B shows the fly-back voltage from the winding 208 in the schematic in FIG. 2A. In the time preceding the event 210, the low side FET 202 was off (as shown in the graph $V_L$) and the high side FET 204 was on (as shown in the graph $V_H$). The $V_H$ graph and $V_L$ graphs depict the voltages at the gates of the high side FET 204, and low side FET 202. A result of the high side driver being on is that a current $I_D$ flows through motor coil 208 in FIG. 2A, shown flowing though the winding. When the high side FET 204 is switched off, the winding voltage node $V_W$ is discharged and approaches zero volts. Also when the high side FET 204 is switched off, the magnetic field in the coil 208 collapses, creating the fly-back voltage $V_F$ across low side FET 202 shown in FIG. 2A. The fly-back voltage $V_F$ pulls the winding voltage $V_W$ negative by a magnitude of $V_F$, so that $V_W$=GND−$V_F$. The fly-back voltage is seen in area 210 on the $V_W$ graph of FIG. 2B. In operation of a system such as system 100, an ADC (not shown in FIGS. 2A-2B) will sample the $V_W$ signal after the fly-back voltage decays, to obtain the BEMF voltage.

Figure 3B:
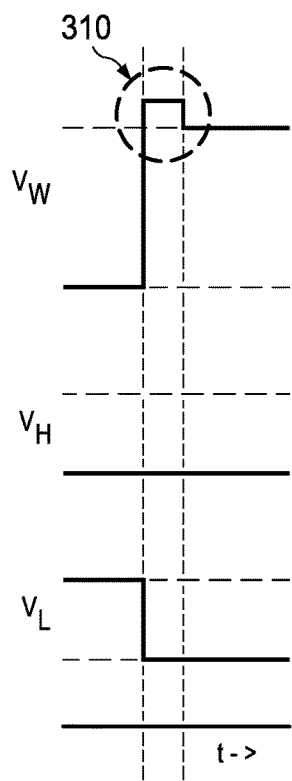
FIGS. 3A and 3B are a circuit schematic of a low side FET controlled motor winding and a graph of the corresponding fly-back voltage, respectively.
Figure 3A:
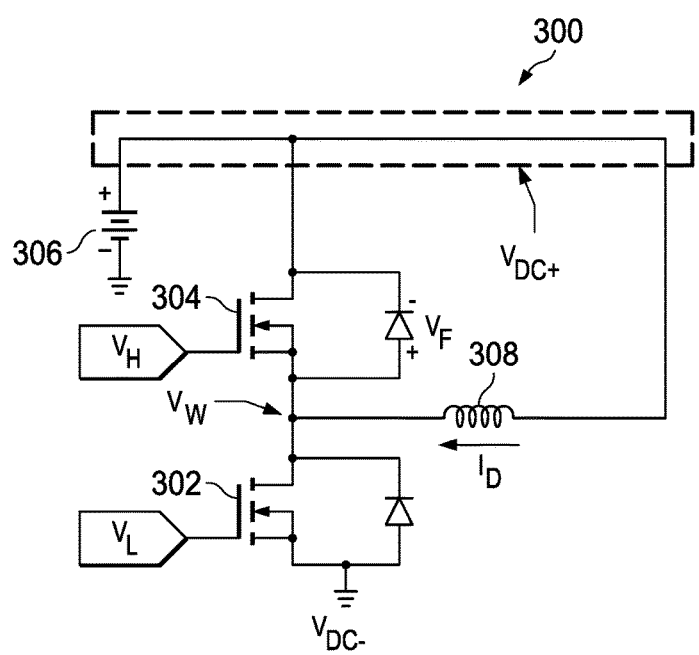

FIGS. 3A and 3B are a schematic of a low side FET controlled motor winding and a graph of the corresponding fly-back voltage, respectively. In FIG. 3A schematic 300 shows a motor winding 308 connected to a pair of FET drivers at node $V_W$, a high side FET 304 and a low side FET 302. A battery 306 supplies system voltage Vdc+. The second terminal of the winding 308 is also connected to Vdc+. The gate of high side FET 304 is driven by control voltage $V_H$ and the gate of the low side FET 302 is driven by control voltage $V_L$.

In FIG. 3B, three graphs $V_W$, $V_H$, and $V_L$ show voltage plotted on a vertical axis and have the same horizontal axis representing time. The top graph illustrates the voltage at the winding node $V_W$, the middle graph illustrates the voltage $V_H$ driving the gate of high side FET 304 and the bottom graph illustrates the voltage $V_L$ driving the gate of low side FET 302. In this situation, the high side FET 304 is off during the entire time, resulting in no current flowing through the high side FET 304.

The region 310 in FIG. 3B shows the fly-back voltage. In the time preceding event 310, graph $V_H$ shows the high side FET 304 is off and graph $V_L$ shows the low side FET 302 is on and then is switched off. A result of the low side FET 302 being on is that a current $I_D$ flows through motor winding 308 in FIG. 3A. When the low side FET 302 is switched off, the winding voltage node $V_W$ approaches the power supply voltage VDC. Also, when the low side FET 302 is switched off, the magnetic field in the winding collapses creating the fly-back voltage $V_F$ across high side FET 304 shown in FIG. 3A. The fly-back voltage increases the winding voltage $V_W$ positive by a magnitude of $V_F$ or $V_W = V_D C + V_F$. The fly-back voltage is seen in area 310 on the $V_W$ graph of FIG. 3B. The ADC (not shown) in the system samples the $V_W$ signal after the fly-back voltage decays to obtain the BEMF voltage.

FIGS. 4A, 4B and 4C are graphs showing a BEMF measurement window. For each of the graphs 400A, 400B, 400C in FIGS. 4A, 4B and 4C, the vertical axis is amplitude in voltage and current, while the horizontal axis represents the rotor angle in degrees from zero degrees to three hundred sixty degrees. The horizontal axis is positioned on the zero amplitude level of the vertical axis. Data lines 410A, 410B and 410C represent BEMF voltage and data lines 420A, 420B and 420C represent the motor current.

In FIG. 4A, graph 400A shows the motor current 420A and the BEMF 410A crossing the zero amplitude at the same angle of one hundred eighty degrees. The flat line labeled 416 in the motor current graph 420A within area 414A is a fifteen degree "window" when the winding lead is floated, allowing the BEMF voltage to be measured. In this particular example, the window duration is shown as about fifteen degrees. In alternative arrangements, the window where the winding lead is floated can be of longer or shorter duration (more or less degrees, or more or less time). When the motor winding current and the BEMF voltage cross the zero amplitude at the same time as shown in graph 400A, this is the optimum drive condition for the motor.

In FIG. 4B, graph 400B illustrates a case where the BEMF voltage 410B crosses zero about ten degrees before the motor current 420B. This event is shown in area 414B. The flat line in motor current 420B in area 414B is where the winding is floated and the BEMF voltage is measured.

In FIG. 4C, graph 400C, the BEMF voltage 410C crosses zero about twenty degrees after the motor current 420C in area 414C. The flat line in motor current 420C in area 414C is where the winding is floated and the BEMF voltage is measured. The angle of the BEMF zero crossing varies with speed and load. To maintain optimal motor efficiency the motor current and BEMF voltage should cross the zero line at the same time as in FIG. 4A.

Figure 5:
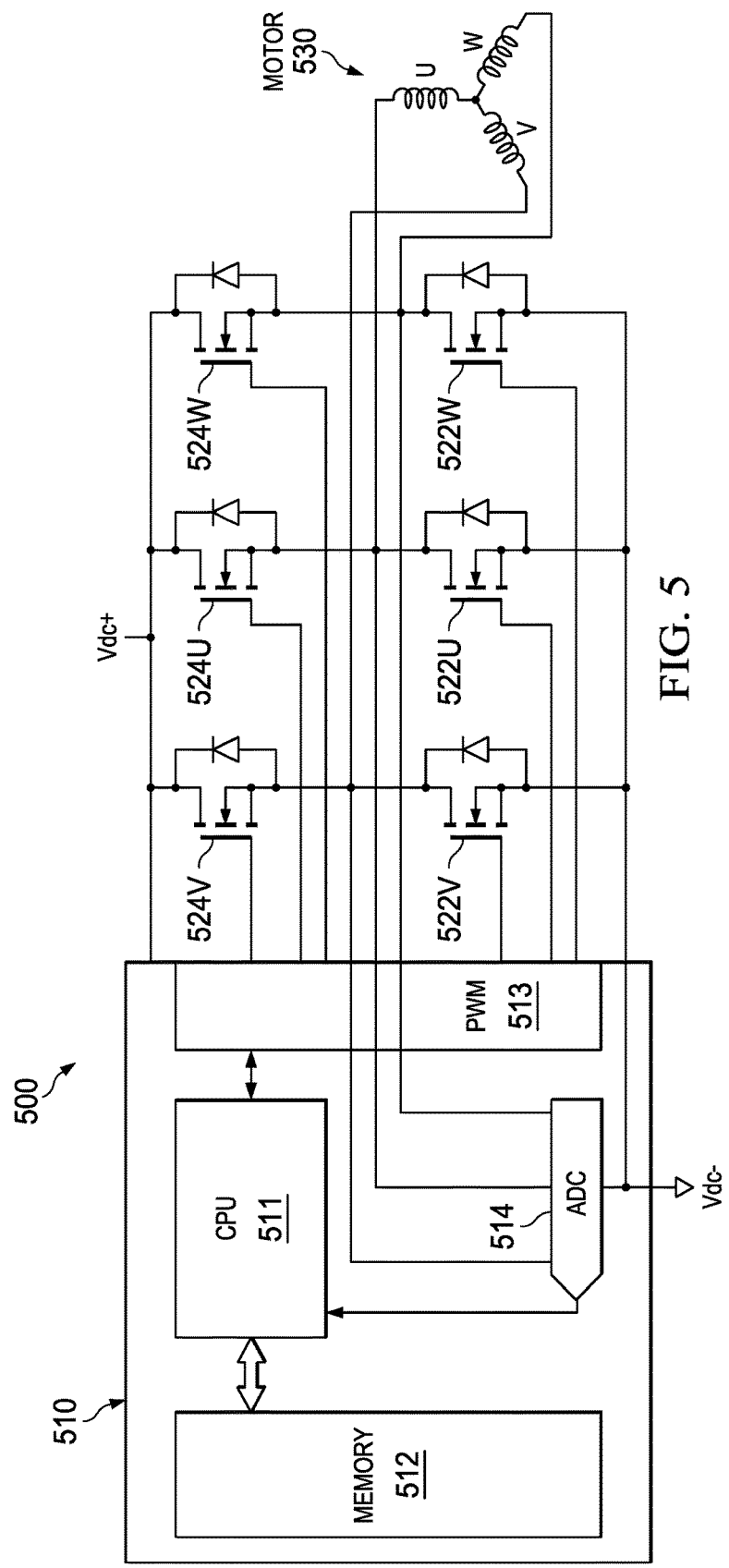
FIG. 5 is a block diagram of a three phase brushless motor driver system that implements an example embodiment.

FIG. 5 is a block diagram of a three phase brushless motor driver system 500 that implements an example embodiment. The reference labels used in FIG. 5 for similar elements are similar to the reference labels used in FIG. 1, for clarity. For example, the motor 530 in FIG. 5 corresponds to motor 130 in FIG. 1. The brushless motor system 500 contains a controller 510, six driver FETS 522U, 522V, 522W, 524U, 524V, 524W, and a motor 530. Within the controller 510, there is at least a CPU 511, memory 512, PWM driver 513 and a sampling circuit coupled to the phase inputs, in this example implemented by ADC 514. The motor 530 phases are designated as U, V, W and each phase has a winding connected to pair of FETS. There are three "high side" FETS 524U, 524V, 524W that couples the winding to Vdc+ and three "low side" FETS 522U, 522V, 522W that couple the winding to Vdc−. The CPU 511 communicates with at least the PWM 513 blocks, memory 512 and the ADC block 514. For simplicity, all communication lines are not shown. The ADC block 514 is coupled to the CPU 511 and the winding connections on phases U, V and W. Depending on a variety of factors, such as the scale of integration, the size and power of the motor, the controller 510 can be an integrated circuit containing all the components shown in block 510. In an alternative embodiment, the integrated circuit controller 510 can also contain the six drive FETS for a lower power motor, or in yet another embodiment the controller can be fabricated entirely of discrete components or some combination of integrated components and discrete components. Within the controller 510, the CPU 511 could be a DSP (digital signal processor), a MCU (micro controller unit) a MSP (mixed signal processor) or any other computational circuit capable of performing the computations. Each of these alternatives forms additional embodiments.

In operation, the controller 510 provides the external commutation for the motor 530. Within the controller 510, a program stored in the memory 512 is executed by the CPU 511 that provides timed pulses to the PWM module 513. The PWM module drives the high side FETS 524V, 524U, 524W and low side FETS 522U, 522V, 522W to supply energy to the electro-magnets resulting in the external-commutating of the motor 530. The commutation of the motor 530 creates a rotational magnetic field resulting in the rotor turning.

The CPU 511 uses the measured BEMF voltage and an inferred motor current phase information to process equations necessary to time the pulses to the PWM section 513. As described hereinabove, the optimum performance is achieved when the BEMF voltage and motor current cross the zero voltage line at the same time. To sense the BEMF voltage, the FETS driving the motor winding are turned off allowing the selected phase lead to "float" for a window of time, such as fifteen degrees or more or less degrees, so that the BEMF voltage can be sampled by the ADC as explained hereinabove in regards to FIG. 4. When the phase lead is floated, there is a collapse of the magnetic field in the phase winding, resulting in a continued voltage on the phase lead. That voltage is commonly referred to as the fly-back voltage, and after the fly-back voltage decays, the BEMF voltage can be sampled by the ADC.

To infer the motor current zero crossing without the need for shunt resistors, the polarity of the fly-back voltage is sampled in two small windows on opposite sides of the expected zero crossing. In this example embodiment, windows of one half degree duration are timed at about two degrees before and two degrees after the expected zero crossing. In other embodiments, the duration of the windows may be larger or smaller and the timing before and after the expected zero crossing may be larger or smaller. When the first window occurs before the motor current crosses the zero current line and the second window occurs after the motor current crosses the zero current line, then the fly-back voltages will have opposite polarity. This indicates that the motor current is within the window and sufficiently in phase with the BEMF voltage that no adjustment to the motor phase is required. If the fly-back voltage readings are of the same polarity, then the motor current is out of phase with the BEMF voltage and a correction to the motor phase is required. Using the polarity of the fly-back voltage allows the CPU 511 to infer the zero crossing of the motor current without the need for shunt resistors, shunt amplifiers or other current sensing hardware. The embodiments enable the fabrication of a motor controller that is less complex, has fewer components, takes less silicon area to fabricate and uses less power than a prior direct current measurement approach. The placement of the sampling windows that allow the CPU 511 to measure the BEMF voltage zero crossing and infer the zero crossing of the current are further explained in the following figure.

FIG. 6 is a graph of motor current and BEMF indicating the sampling windows from an example embodiment. In graph 600, the vertical or y-axis plots both voltage magnitude and current magnitude, the horizontal or x-axis plots time in degrees. Data line 610 is the BEMF voltage and data line 620 is the motor current. The BEMF sampling window is seen in area 616 as the flat section in motor current 620. Area 626 contains two additional sampling windows, however their duration is so short, such as one half degree, they cannot be seen as flat line, but instead their position is indicated by the arrows 624 and 628.

At the falling zero crossing at area 616, the flat line indicates where the motor current 620 is floated and a window of fifteen degrees is available for the ADC to sample the BEMF voltage after the fly-back voltage has decayed. From the BEMF data, the next rising zero crossing is estimated. Just before the next estimated rising zero crossing 626, the motor current is floated for a first window 624 of about one half degree. The first window can also be more or less degrees, or more or less time, to form alternative embodiments. During the first window 624, the ADC samples the fly-back voltage to determine the polarity. The motor current is floated for a second window 628 for about a half degree (or more or less) and positioned just after the expected zero crossing of the motor current. During the second window, the ADC samples the fly-back voltage to determine the polarity. With the windows 624 and 628 very closely spaced, such as +/−2 degrees from the expected zero crossing, if the polarity of the two fly-back voltage samples are opposite, then the motor current phase is considered sufficiently aligned to the BEMF phase so that no adjustment to the applied motor voltage phase angle is needed. As for the other windows, the spacing can be more or less than the example 2 degrees described here. If both of the fly-back voltage samples have the same polarity, then the motor current phase angle is not sufficiently aligned with the BEMF phase and the applied motor voltage phase angle is adjusted. When the polarity of the fly-back voltages are both positive, then the motor phase angle is advanced. When the polarity of the fly-back voltages are both negative, then the motor phase angle is retarded. The falling edge 616 and rising edge 626 measurements used in this example embodiment can be performed on opposite sloped edges in other example embodiments. The measurement windows 624 and 628 are shown on the next rising zero crossing from the BEMF voltage measurement in 616 in this example embodiment. In other example embodiments, the measurement windows 624 and 628 could be at any following estimated zero crossing from the BEMF window 616. Measurement windows 624 and 628 are shown around the same estimated zero crossing in this example embodiment; however, in other example embodiments, the measurement windows can be taken on different zero crossings.

Figure 7A:
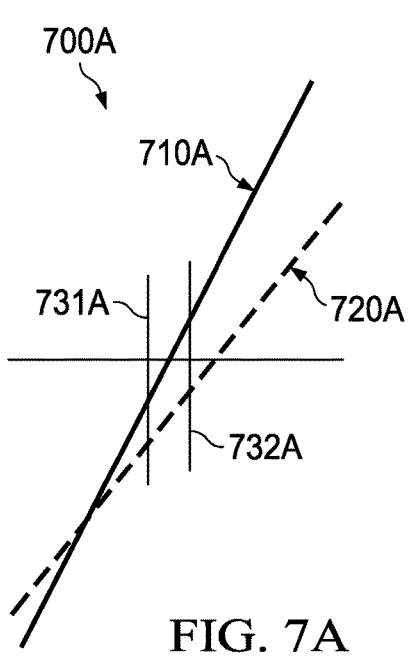
FIGS. 7A, 7B and 7C are graphs of sampling windows.
Figure 7B:
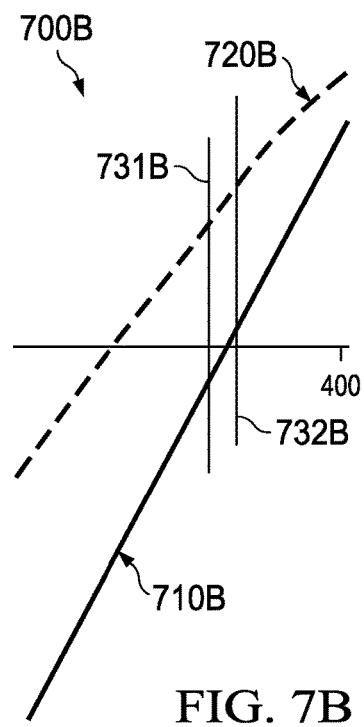
Figure 7C:
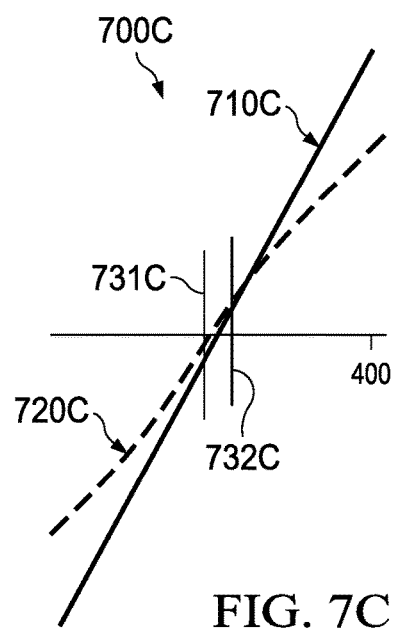

FIGS. 7A, 7B and 7C are graphs of sampling windows. Graphs 700A, 700B and 700C are example embodiments of sampling windows for inferring the zero crossing point. In graphs 700A, 700B and 700C, the vertical axis is volts for the BEMF 710A, 710B, 710C and amps for the motor current 720A, 720B and 720C. The horizontal axis is rotational degrees. A sampling window 731A, 731B, 731C is positioned just before the BEMF crosses zero, such as −2 degrees. The second sampling window 732A, 732B, 732C is positioned just after the BEMF crosses zero, such as +2 degrees. The duration and spacing of the sampling windows can be varied to form alternative embodiments.

In operation, referring to graph 700A, the two sampling windows 731A, 732A occur before the motor current crosses the zero reference. This results in the polarity of the fly-back voltage measurements reading being negative, causing the controller to advance the applied voltage lead angle. The advance in voltage lead angle results in the zero crossing of the motor current 720A shifting towards the zero crossing of the BEMF voltage.

Referring to graph 700B, the two sampling windows 731B, 732B occur after the motor current crosses the zero reference. This results in the polarity of each flyback voltage measurement being negative, causing the controller to retard the applied voltage lead angle. The retarding of the voltage lead angle results in the zero crossing of the motor current 720B shifting towards the zero crossing of the BEMF voltage.

Referring to graph 700C, the first sampling window 731C returns a positive polarity and the second sampling window 732C returns a negative polarity, causing the controller to maintain the current applied voltage lead angle. The opposite polarity of the two fly-back voltage measurements indicates that the motor current is aligned to the BEMF zero crossing within the span of the sampling windows, such as +/−2 degrees in this example.

By using the polarity of the two fly-back voltage measurements around the expected zero crossing, the angle of the motor current can be determined without the need to directly measure the motor current. Use of the embodiment measurement approach eliminates the need for the motor current shunt resistors and the phase shunt amplifiers in prior approach controllers.

Figure 8:
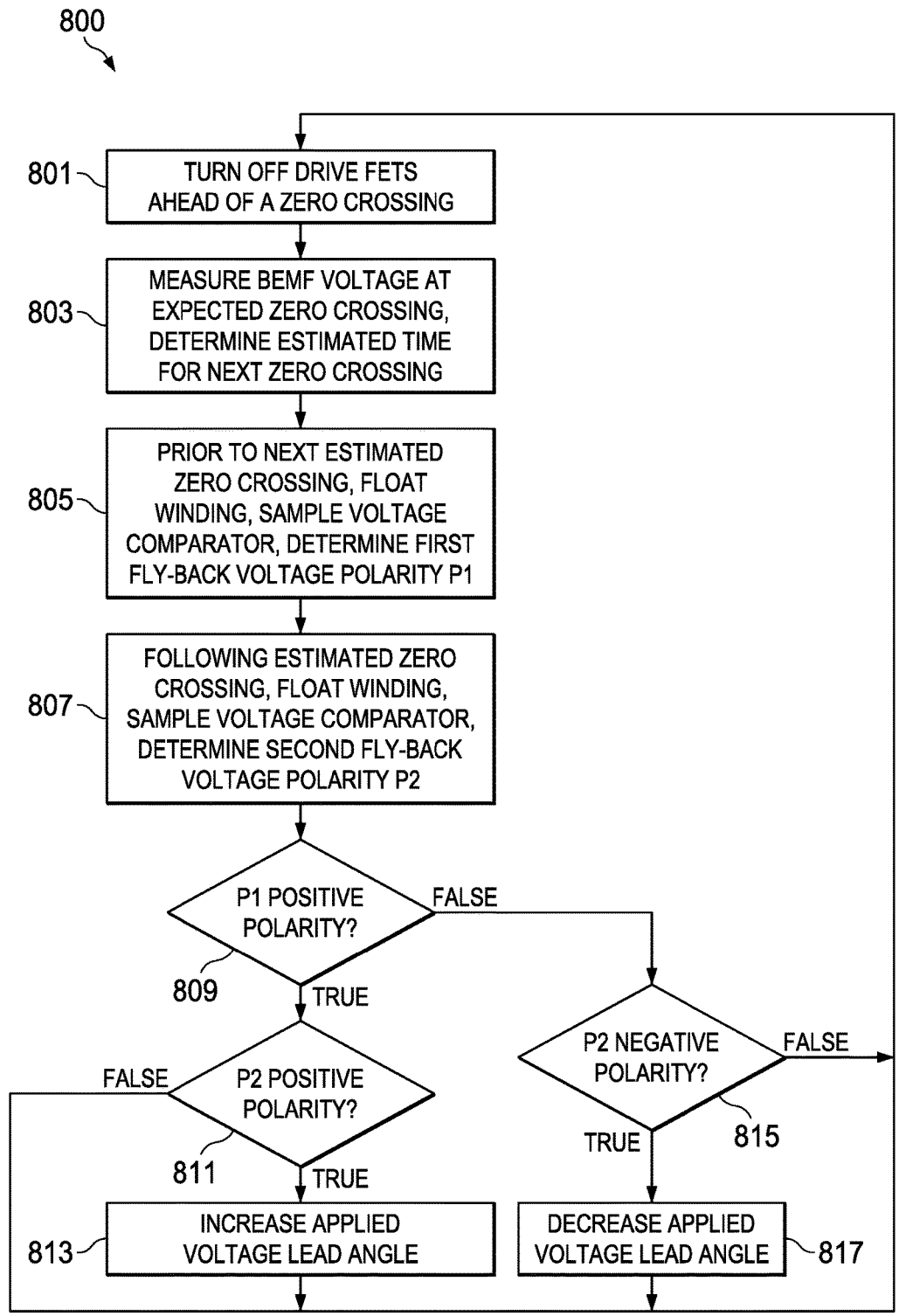
FIG. 8 is a flow chart for a method embodiment.

FIG. 8 is a flow chart for a method embodiment 800. In step 801, the method begins by turning off the drive FETS supplying current to the motor ahead of an expected zero crossing, for example as shown in FIG. 6, the current to the motor winding stops about fifteen degrees prior to the expected zero crossing to allow time for the fly-back voltage to dissipate. At step 803, the BEMF voltage is measured at the expected zero crossing, the point of zero crossing is determined, and the time of the next estimated zero crossing is determined. At step 805, using the estimated next zero crossing time from step 803, the current to the winding is stopped (the driver FETS are turned off briefly) just before the expected zero crossing point, and the polarity P1 of the fly-back voltage is sampled. In an example, the window for the measurement can be about one half a degree in duration and about two degrees prior to the expected zero crossing point.

At step 807, the method 800 continues by taking a second fly-back voltage polarity sample P2, just after the expected zero crossing point. For example, the window for the measurement can be about one half of a degree in duration and can be two degrees past the expected zero crossing point.

At step 809, the method determines if the first polarity sample P1 is positive. If true then the method determines if the second polarity P2 is positive in step 811. If true, then both samples P1 and P2 are positive and the lead angle of the applied voltage is increased in step 813, and the method begins again in step 801. If the decision in step 811 is false, then the polarities are opposite, no change to the applied voltage lead angle is required and the method begins again in step 801. If the decision in step 809 is false, then step 815 determines if polarity P2 is negative. If the decision in 815 is true, then both polarities P1 and P2 are negative and the applied voltage lead angle is decreased in step 817 and the method begins again in step 801. If the decision in step 815 is false, the polarities P1 and P2 are opposite, no change to the applied voltage lead angle is required and the method begins again in step 801.

Following any of the steps 811, 813, 815 and 817, the method transitions back to step 801 and repeats. In this manner the method dynamically and continuously adjusts the voltages applied to the high side and low side driver devices to align the motor current phase angle with the BEMF. The method results in the motor operating in the most efficient manner under varying speeds and loads. Use of the embodiments achieves efficient operation over a wide variety of rotor speeds and loads with a reduction in complexity, component count and a reduction in the size of the integrated circuit. The fly-back voltage polarity measurements used in the embodiments indicate the zero current crossing without direct current measurement circuitry. Use of the embodiments therefore eliminates the need for direct current measurements and the associated sensors, while providing efficient motor operation.

Modifications are possible in the described embodiments, and other embodiments are possible within the scope of the claims.

What is claimed is:

1. A method, comprising:
   outputting high side driver gate signals to a plurality of high side driver devices and outputting low side driver gate signals to a plurality of low side driver devices configured to control current supplied to a motor having coils coupled to receive the current at a plurality of phase nodes positioned between respective ones of the high side driver devices and the low side driver devices for phases of the motor;
   at a time approximately prior to an expected zero crossing of a voltage at a selected one of the plurality of phase nodes, disabling the high side driver gate signal to the respective high side driver device and the low side driver gate signal to the respective low side driver device that are coupled to the selected one of the phase nodes;
   measuring a back electromotive force (BEMF) voltage by sampling the voltage at the selected one of the phase nodes and observing a zero crossing time;
   using the observed zero crossing time, estimating a next zero crossing time at the selected one of the phase nodes;
   using the high side driver gate signal and the low side driver gate signals to supply current at the selected one of the phase nodes, operating the motor;
   prior to the next zero crossing time, disabling the high side driver gate signal to the respective high side driver device and the low side driver gate signal to the respective low side driver device that are coupled to the selected one of the phase nodes and observing a first voltage at the selected one of the phase nodes to form a first sample;
   following the next zero crossing time, observing a second voltage at the selected one of the phase nodes to form a second sample; and
   using the first sample and the second sample, determining a first coil current polarity corresponding to the first sample and a second coil current polarity corresponding to the second sample;
   determining from the first coil current polarity and the second coil current polarity whether a motor current and a back electromotive force (BEMF) of the motor are in phase;
   in which the determining includes comparing the first coil current polarity and the second coil current polarity; and
   in which if the comparing indicates the first coil current polarity and the second coil current polarity are opposite, a lead angle adjustment for the motor is determined to be aligned.

2. The method of claim 1, in which if the comparing indicates the first coil current polarity and the second coil current polarity are the same polarity and positive, a lead angle adjustment of the motor is adjusted by increasing the lead angle using the low side driver gate signals and high side driver gate signals.

3. The method of claim 1, in which if the comparing indicates the first coil current polarity and the second coil current polarity are the same and negative, a lead angle adjustment of the motor is adjusted by decreasing the lead angle using the low side driver gate signals and high side driver gate signals.

4. An apparatus, comprising:
   a motor having multiple phase inputs, and a respective high side driver device coupled between a voltage supply and the phase inputs and having a high side driver gate signal coupled to control the high side driver device, and having a respective low side driver device coupled between the phase inputs and a ground potential, and having a low side driver gate signal coupled to control the low side driver device;
   a motor controller coupled to the low side driver gate signals and coupled to the high side driver gate signals, to supply current to the phase inputs in a pattern to cause the motor to rotate by supplying the low side driver gate signals and the high side driver gate signals, respectively, to the high side driver devices and the low side driver devices coupled to the phase inputs to operate the motor;
   the motor controller including:
      a sampling circuit coupled between the phase inputs and a center tap of the motor to sample a back electromotive force (BEMF) voltage of the phase inputs;
      the motor controller to observe a sampled BEMF voltage at a selected phase input using the sampling circuit by disabling the high side driver gate signal and the low side driver gate signal to the selected phase input;
      the motor controller to estimate a next zero crossing time using the observed sampled BEMF voltage;
      the motor controller to disable the high side driver device and the low side driver device of the selected phase input by disabling the high side driver gate signal and the low side driver gate signal prior to the next zero crossing time;
      the motor controller to use the sampling circuit to take a first sample of a flyback voltage; and
      the motor controller further to use the sampling circuit to take a second sample of the flyback voltage at a second sample time after the next zero crossing time.

5. The apparatus of claim 4, in which the sampling circuit includes an analog-to-digital converter coupled to the phase inputs.

6. The apparatus of claim 4, in which the motor controller includes a processor to output the high side driver gate signals and the low side driver gate signals.

7. The apparatus of claim 4, in which the motor controller further determines a first coil current polarity from the first sample and determines a second coil current polarity from the second sample, and compares the first coil current polarity to the second coil current polarity.

8. The apparatus of claim 7, in which the motor controller further determines whether the first coil current polarity is opposite to the second coil current polarity, indicating a proper lead angle alignment.

9. The apparatus of claim 7, in which the motor controller determines whether the first coil current polarity and the second coil current polarity are positive, and if so, the motor controller adjusts a lead angle of the motor by increasing the lead angle.

10. The apparatus of claim 7, in which the motor controller determines whether the first coil current polarity and the second coil current polarity are negative, and if so, the motor controller adjusts a lead angle of the motor by decreasing the lead angle.

11. An integrated circuit, comprising:
a motor controller coupled to output a high side driver gate signal and a low side driver gate signal for phases of a motor, to operate high side driver devices coupled between a voltage supply and phase inputs of the motor, and to operate low side driver devices coupled between phase inputs of the motor and a ground potential;
a sampling circuit coupled to at least one of phase inputs corresponding to at least one phase of the motor;
the motor controller configured to:
operate the motor by outputting a high side driver gate signal and a low side driver gate signal for a selected phase input of the motor, to cause current to be supplied to the motor from the phase input of the motor by enabling and disabling a high side driver device and a low side driver device;
prior to an expected zero crossing point of the selected phase of the motor, disable both the high side driver gate signal and the low side driver gate signal for the phase input to the motor;
using the sampling circuit, observe the zero crossing point of a BEMF voltage at the selected phase input;
estimate a time of the next zero crossing point;
prior to the next zero crossing point, disable the high side driver gate signal and the low side driver gate signal for the phase input to the motor;
using the sampling circuit, take a first voltage sample prior to the next zero crossing point;
using the sampling circuit, take a second voltage sample after the next zero crossing point;
using the first sample and the second sample, determine whether the BEMF and the motor current phase are in alignment; and
in which the motor controller compares a first coil current polarity derived from the first sample to a second coil current polarity derived from the second sample, and if the first coil current polarity is opposite the second coil current polarity, a lead angle of the motor is in adjustment.

12. The integrated circuit of claim 11, in which the motor controller includes a processor.

13. The integrated circuit of claim 11, in which the sampling circuit includes an analog-to-digital converter.

14. The integrated circuit of claim 11, in which the motor controller includes a pulse width modulated pulse generator outputting the high side driver gate signals and the low side driver gate signals.

15. The integrated circuit of claim 11, in which the motor controller compares a first coil current polarity derived from the first sample to a second coil current polarity derived from the second sample, and if the first coil current polarity is the same as the second coil current polarity, the motor controller adjusts a lead angle of the motor.

* * * * *